United States Patent [19]
Bremer et al.

[11] Patent Number: 5,387,270
[45] Date of Patent: Feb. 7, 1995

[54] METHOD AND APPARATUS FOR PRESSING AND CONTACT TOUGHENING GLASS SHEETS

[75] Inventors: Carsten Bremer, Wassenberg; Hans-Werner Nowoczyn; Horst Mucha, both of Aachen; Werner Diederen, Herzogenrath; Hans-Werner Kuster, Aachen, all of Germany

[73] Assignee: Saint-Gobain Vitrage International, Courbevoie, France

[21] Appl. No.: 117,700

[22] Filed: Sep. 8, 1993

[30] Foreign Application Priority Data

Sep. 12, 1992 [DE] Germany ............................. 4230611

[51] Int. Cl.$^6$ ..................... C03B 23/03; C03B 27/004
[52] U.S. Cl. ..................... 65/29.12; 65/104; 65/158; 65/159; 65/268
[58] Field of Search ..................... 65/27, 29, 104, 114, 65/158, 159, 168, 268, 348, 349

[56] References Cited

U.S. PATENT DOCUMENTS

| | | | |
|---|---|---|---|
| 3,846,106 | 11/1974 | Seymour | 65/168 |
| 4,233,048 | 11/1980 | Gintert | 65/27 |
| 4,666,491 | 5/1987 | Ehre | 65/27 |
| 4,983,205 | 1/1991 | Kuster et al. | 65/104 |

Primary Examiner—Joye L. Woodard
Attorney, Agent, or Firm—Oblon, Spivak, McClelland, Maier & Neustadt

[57] ABSTRACT

A production installation for the contact toughening of glass sheets comprises a horizontal furnace for heating the glass sheets, a press containing two liquid-cooled pressing plates, a feed apparatus for transferring the heated glass sheets into the press and a removal apparatus for removing the toughened glass sheets out of the press. To the lower pressing plate, a solids-transmitted sound pick-up is coupled which, if a glass sheet breaks in the press, supplies an electrical signal. From this signal, after suitable processing of the signal, the control device is triggered, and as a result thereof interrupts the process sequence.

8 Claims, 2 Drawing Sheets

METHOD AND APPARATUS FOR PRESSING AND CONTACT TOUGHENING GLASS SHEETS

BACKGROUND OF THE INVENTION

1. Field of the Invention

This invention relates to a method of controlling a device for the contact toughening of glass sheets, comprising a horizontal furnace for heating glass sheets, a press containing two liquid-cooled pressing plates, a feed apparatus for transferring the heated glass sheets into the press and a device for removing the glass sheets from the press. The invention furthermore relates to apparatuses for carrying out this method.

2. Discussion of the Related Art

Usually, the toughening of glass sheets is performed by blowing cold air streams onto the glass sheets heated to a toughening temperature. During the toughening treatment, the glass sheet is either held in a vertical position by tongs which grip the upper edge of the glass sheet, or the glass sheet rests in a horizontal orientation with its edge on a support ring. If, with the abrupt cooling by air, a glass sheet shatters, the glass fragments fall unimpeded, for example into a fragment container disposed underneath the toughening apparatus. The rhythm of the toughening process is therefore not adversely affected or interrupted during continuing production.

In the case of so-called contact toughening, the sudden cooling of the glass sheets, heated to toughening temperature, takes place by the intensive contact of the hot glass sheets with the water-cooled surfaces of two pressing plates of a press. Devices for contact toughening are, for example, known from DE-OS 1 771 7909, EP 0 277 074 B1 and DE 4 019 181 A1. The pressing plates may also be constructed as bending molds. In this manner it is possible simultaneously to bend the glass sheets heated to toughening temperature to a desired shape and to toughen them. This method has, compared with the usual air toughening, the advantage that by the direct contact with the pressing plates, it is possible to avoid deformations or distortions of the glass sheet that can occur in certain circumstances, when the glass sheet during air toughening is held only at the edge or on one face.

The contact toughening is carried out in a horizontal position of the glass sheets, because the glass sheets must come into contact over their entire surface with the pressing plates. If, in contact toughening, a glass sheet shatters, the glass fragments consequently remain completely or at least partly resting on the lower pressing plate. Before the next glass sheet, heated to toughening temperature, can be laid on the lower pressing plate, this pressing plate must be completely cleared of the glass fragments. Otherwise, in contact toughening of the next glass sheets, damage to the surfaces of the pressing plates and to the glass sheet itself will occur.

SUMMARY OF THE INVENTION

An object of the present invention is so to arrange an automatically operating production line, provided with a contact toughening device, that in the case of a glass breakage in the toughening press, damage to the pressing plates shall be avoided and production loss shall be minimized.

According to the invention this object is achieved in that, if a breakage of a glass sheet occurs in the press, the acoustic signal resulting from the breakage is utilized for triggering a control circuit that controls the process sequence in such a manner that, when the signal occurs, the process sequence is automatically interrupted.

Experiments have shown that it is difficult, in a production factory under practical conditions, to find a criterion for the breakage of a glass sheet in the press of a contact toughening installation which will give an unambiguous signal on breakage of a glass sheet. Thus, for example, optical monitoring of the lower pressing plate has proved unsuitable. In contrast, it has been found that the acoustic vibration resulting from a glass breakage in the press has a characteristic frequency spectrum, which is better suited to the purpose of this invention than other criteria.

By the acoustic monitoring of the press according to this invention and the automatic interruption of the production process when an acoustic signal occurs that indicates a glass sheet breakage in the press, damage to the press molds or tools, which occurs at the sensitive surfaces of the pressing tools if glass breakage fragments having sharp edges rest upon the lower pressing plate during the pressing operation, is avoided. Moreover, the loss of production is avoided that would occur if the surface of the next succeeding glass sheet were to be damaged by glass fragments in the press. The automatic interruption of the production sequence, which at the same time can be associated with an optical or acoustic alarm signal, is utilized for removing the glass fragments from the lower press mold, which for example can be done by hand.

In a further embodiment of the invention, the operation of removing the glass fragments and the cleaning of the lower press plate is carried out by a suitable mechanical or pneumatic device, which is automatically set in operation when the acoustic signal that indicates the breakage of a glass sheet occurs. In this manner the press is completely automatically ready again for the next pressing operation a very short time after the occurrence of a glass sheet breakage.

Since the airborne noise created by the breakage of a glass sheet proves comparatively weak and furthermore is frequently blanketed by general machine noise, in an embodiment of the present invention, a mechanical-electrical transducer is coupled directly to the lower press plate in such a manner that it detects the solid body noise induced in the press plate when a glass sheet breaks. As mechanical-electrical transducers, special body noise microphones, which are also known as acceleration pick-ups, have proved particularly suitable for this purpose.

Accordingly, the present invention relates to a method of controlling a device for the contact toughening of glass sheets which comprises the steps of heating a glass sheet in a horizontal furnace; conveying the heating glass sheet into a press; pressing the glass sheet in the press; removing the glass sheet from the press; and detecting a breakage of a glass sheet in the press by using an acoustic signal resulting from the breakage to trigger a control circuit controlling an automatic sequence of the process in a manner that when the acoustic signal occurs, the automatic process sequence is interrupted.

The present invention further relates to a device for the contact toughening of glass sheets which comprises a horizontal furnace for heating glass sheets; a press having first and second liquid-cooled pressing plates for pressing the glass sheets; a feed apparatus for conveying the heated glass sheets from the furnace to the press; a removal apparatus for removing the glass sheets from the press; an electronic control apparatus for automatically controlling the device; and a solid body noise pick-up coupled to one of the first and second pressing plates for detecting a breakage of a glass sheet in the press and supplying an electrical signal for triggering the control apparatus so as to interrupt a process sequence of the device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
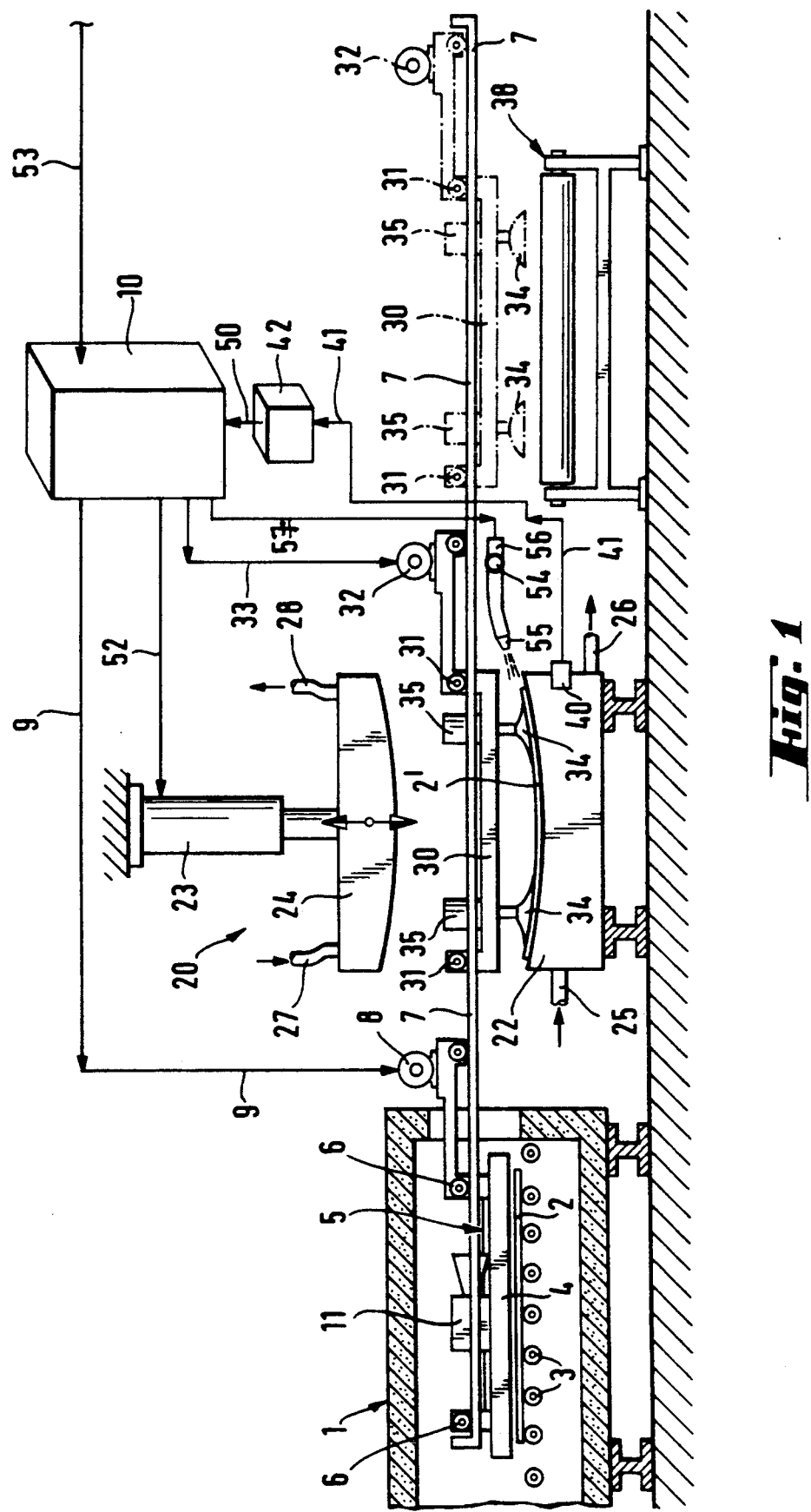
FIG. 1 shows an installation for the contact toughening of glass sheets having the features according to the present invention, in schematic view.

Referring now to the drawings, wherein like reference numerals designate identical or corresponding parts throughout the several views, and more particularly to FIG. 1 thereof, an installation for the production of toughened glass sheets, such as are used to a wide extent, for instance, as safety glass panes for automobiles, possesses a roller straight-through furnace 1, through which the plane glass sheets 2 are transported on driven conveying rollers 3 and are heated to their toughening temperature of about 650° C. At the end of the furnace 1, the hot glass sheets 2 are lifted off the conveying rollers 3 by a suction plate 4 and brought by means of this suction plate 4 into a toughening station 20.

The suction plate 4 is fixed to a mobile carriage 5, which is mounted on wheels 6 and can travel on rails 7. The carriage 5 is provided with a drive motor 8, which is controlled from the control unit 10 via a line 9. On the carriage 5, a suction blower 11 is also mounted, which generates the suction necessary for sucking up the glass sheets 2.

Behind the straight-through furnace 1 there is the toughening station 20 comprising a press for contact toughening. This press consists of a stationarily mounted, lower pressing plate 22 and of an upper pressing plate 24, movable in a vertical direction by means of a pressure cylinder 23. The lower pressing plate 22 and the upper pressing plate 24 have a form of construction such as is described, for example, in EP 0 404 677. The lower pressing plate 22 and the upper pressing plate 24 are water-cooled, the cooling water in the case of the lower pressing plate 22 being supplied through a feed pipe 25 and discharged through a pipe 26. In the case of the upper pressing plate 24, flexible hoses 27 and 28 assure the feed and discharge of the cooling water. The lower pressing plate 22 and the upper pressing plate 24 are, in the case illustrated, constructed with domed pressing surfaces, so that the glass sheets can be simultaneously bent into a desired shape by this press.

The installation also comprises a device for automatically removing the toughened glass sheets 2' from the opened toughening press. This removal device comprises a carriage 30, which can run on rails 7 by wheels 31 and is provided with a drive motor 32. The drive motor 32 is controlled from the control unit 10 via a line 33. The carriage 30 is equipped with suction cups 34, by which the toughened glass sheets 2' are gripped and raised by means of pneumatic cylinders 35, before the carriage 30 travels over the roller conveyor 38, onto which the glass sheets 2' are deposited.

To the lower pressing plate 22, one or more acoustic pick-ups 40 are mechanically coupled in such a way that they detect the solid body noise transmitted to the lower pressing plate 22 if a glass sheet breaks. As sound pick-ups 40, so-called acceleration pick-ups, that is to say electromechanical transducers, have for example proved suitable, such as are used for measuring mechanical vibrations and impacts. Particularly suitable have proved to be those known as absolute vibration pick-ups, which in contrast to relative vibration pick-ups, do not require any at-rest reference point. Such an absolute vibration pick-up is, for example, constructed by a piezoelectric transducer element being coupled to a freely vibrating mass as a thickness vibrator or shear vibrator. If such a system is accelerated in the axial direction, the vibrating mass exerts upon the piezoelectric element a force proportional to its acceleration, deforms the element and thus creates electrical charges that are proportional to the force.

Piezoelectric acceleration pick-ups of this type are favorably used, which have a frequency response curve largely corresponding to the frequency band of the vibrations created when a glass sheet breaks. The output signal of the acoustic pick-up 40 is fed via the flexible line 41 to the signal processing stage 42.

Figure 2:
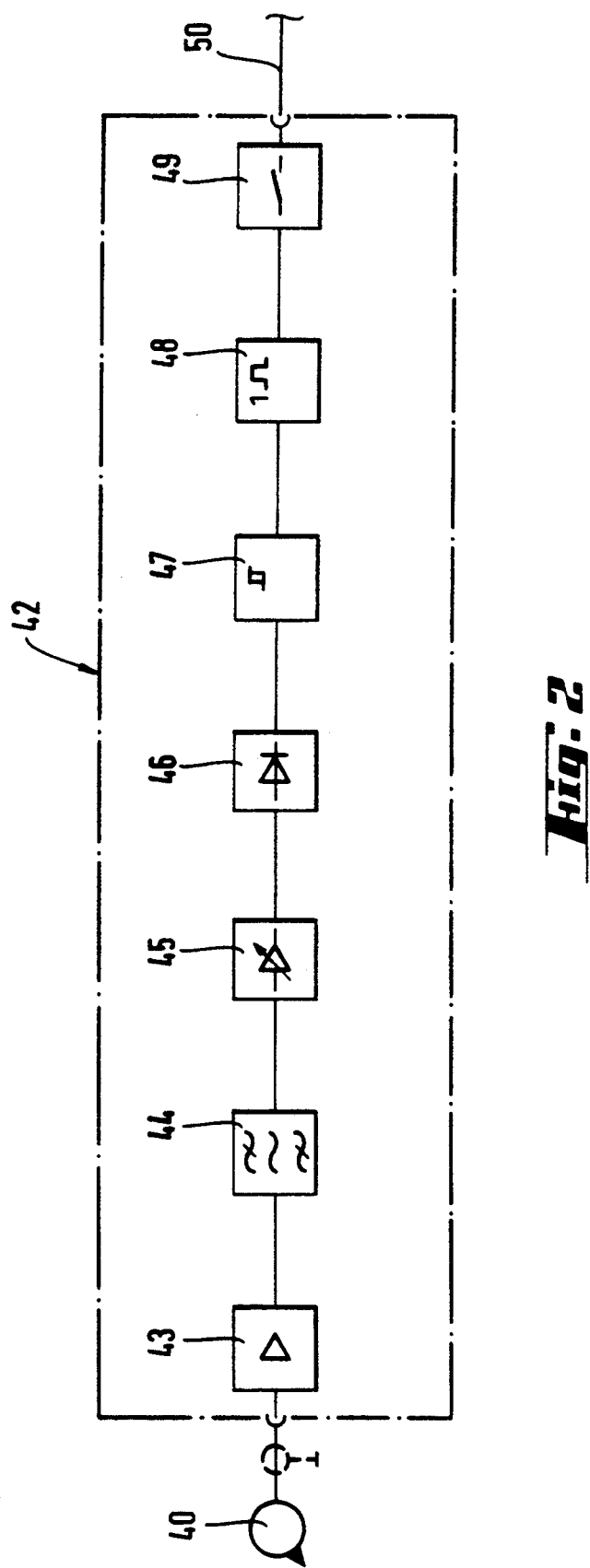
FIG. 2 shows a block diagram of an electronic assembly for the signal processing.

The construction of the signal processing stage 42 is illustrated in FIG. 2. The signal processing stage 42 comprises a preamplifier 43, a band-pass filter 44, an adjustable signal amplifier 45, a rectifier 46, a threshold value switch 47, a pulse lengthener 48 and a signal output 49. The comparatively weak signal coming from the acoustic pick-up 40 is first sufficiently amplified in the preamplifier 43 and then supplied to the band-pass filter 44, in which the environmental and machine noises are suppressed. The thus formed signal is once again amplified in the adjustable amplifier 45 and then rectified by the rectifier 46. It is then fed to the adjustable threshold value switch 47, which is only released so long as a breakage can be expected, that is to say a glass sheet is present in the press. The signal output 49 is connected to the threshold value switch 47 via the pulse lengthener 48.

If a signal is emitted from the signal output 49, then via the line 50 the control unit 10 is triggered, which as a central process control coordinates the individual process steps and ensures the entire process sequence. The control unit 10 is programmed so that, in the case of a sheet breakage, the press is opened via the control line 52, but the drive rotors 8 and 32 are not activated so that the carriage 5 remains in its position in the furnace 1 and the carriage 30 in its position above the roller conveyor 38 until continuation of the process sequence is again released via the line 53. During this period, the lower pressing plate 22 is cleansed of the glass fragments. The cleaning can be done by hand, in which case the release is given by hand via the line 53 after the cleaning operation is completed. Cleaning may also take place fully automatically, for example by means of blowing nozzles 55 connected to a compressed air line 54, with solenoid valves 56 which release the compressed air stream being controlled via the line 57, also from the control unit 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of controlling a device for pressing and contact toughening of glass sheets, the method comprising the steps of:
   heating a glass sheet in a horizontal furnace;
   conveying said heated glass sheet into a press;
   pressing and contact toughening said glass sheet in said press;
   removing said glass sheet from said press; and
   detecting a breakage of a glass sheet in the press by using an acoustic signal resulting from the breakage to trigger a control circuit controlling the conveying, pressing and contact toughening and removing steps in a manner that when said acoustic signal occurs, the conveying, pressing and contact toughening and removing steps are interrupted.

2. A device for the pressing and contact toughening of glass sheets, the device comprising:
   a horizontal furnace for heating glass sheets;
   a press having first and second light-cooled pressing plates for pressing the glass sheets;
   a feed means for conveying the heated glass sheets from said furnace to said press;
   a removal means for removing the glass sheets from the press;
   an electronic control means for automatically controlling the operation of the feed means, the press and the removal means; and
   at least one solid body noise pick-up means coupled to one of said first and second pressing plates for detecting a breakage of a glass sheet in said press and supplying an electrical signal for triggering the control means so as to interrupt the preparation of the feed means, the press and removal means.

3. A device according to claim 2, wherein said solid body noise pick-up means has a sensitivity characteristic which has its maximum sensitivity at a maximum intensity of a body noise induced in the pressing plate at the breakage of a glass sheet.

4. A device according to claim 3, wherein said solid body-noise pick-up means comprises an electromechanical transducer.

5. A device according to one of claims 2 to 4, wherein said first and second pressing plates are horizontally arranged and the body noise pick-up means is disposed in a lower pressing plate of said first and second pressing plates.

6. A device according to claim 5, further comprising a signal treatment apparatus connected behind the body noise pick-up means.

7. A device according to claim 6, wherein the signal treatment apparatus comprises a preamplifier, a bandpass filter, an adjustable signal amplifier, a rectifier, a threshold value switch and a pulse lengthening circuit.

8. A device according to claim 7, further comprising an automatic cleaning apparatus, which can be activated by a signal coming from the signal treatment apparatus, for the purpose of cleaning the lower pressing plate of glass fragments.

* * * * *